United States Patent
Chau et al.

(10) Patent No.: US 7,376,654 B1
(45) Date of Patent: May 20, 2008

(54) SYSTEM AND METHOD FOR PERFORMING REMOTE TRACKING AND REPORTING OF COMPUTING SYSTEM PERFORMANCE, USAGE, AND SECURITY DATA

(75) Inventors: Bill Chau, Kirkland, WA (US); Fuyau Lin, Woodinville, WA (US); Chi-Ming Lin, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 423 days.

(21) Appl. No.: 10/426,070

(22) Filed: Apr. 29, 2003

(51) Int. Cl.
G06F 7/00 (2006.01)
G06F 17/00 (2006.01)
G06F 15/173 (2006.01)

(52) U.S. Cl. ................. 707/100; 707/102; 709/224
(58) Field of Classification Search ............. 707/1–10, 707/100–104; 709/224; 705/51
See application file for complete search history.

(56) References Cited

U.S. PATENT DOCUMENTS

| | | | |
|---|---|---|---|
| 6,768,994 B1 * | 7/2004 | Howard et al. | 707/10 |
| 6,789,115 B1 * | 9/2004 | Singer et al. | 709/224 |
| 6,839,751 B1 * | 1/2005 | Dietz et al. | 709/224 |
| 6,961,765 B2 * | 11/2005 | Terry | 709/224 |
| 2002/0128925 A1 * | 9/2002 | Angeles | 705/26 |
| 2002/0169871 A1 * | 11/2002 | Cravo de Almeida et al. | 709/224 |
| 2004/0019677 A1 * | 1/2004 | Fukumoto et al. | 709/224 |

OTHER PUBLICATIONS

Deepmetrix, LiveStats 6.2 Service Provider Administrator's Guide, https://www.deepmetrix.com/customercare/documents/retired/ls6$_{13}$xsp/index.html*
Robert Ecksten, Webmaster in a Nutshell, 3$^{rd}$ Edition, O'Reilly Publisher, Dec., 2002, Chapter 10.*
Deepmetrix, LiveStats 6.2 Service Provider Administrator's Guide, 2002. https://www.deepmetrix.com/customercare/documents/retired/ls6$_{13}$ xsp/index. html , (2 pages).*
Deepmetrix, http://web.archive.org/web/20020802031436/www.deepmetrix.com (1 page).*
Deepmetrix, LiveStats 6.2 Service Provider Administrator's Guide, https://www.deepmetrix.com/customercare/documents/retired/ls6$_{13}$ xsp/index.html, 2002, 11 pages.*

(Continued)

*Primary Examiner*—Hosain Alam
*Assistant Examiner*—Shew-Fen Lin
(74) *Attorney, Agent, or Firm*—Merchant & Gould (57) ABSTRACT

A computing systems data reporting system is comprised of a processing component and a reporting component. The processing component includes a configuration file and a system analysis and aggregation executable program module. The system analysis and aggregation executable module utilizes the input and output directory information from the configuration file to collect performance, usage and security data from sources such as those described above. The reporting component comprises an XML output memory component for storing aggregated data received from the executable module of the processing component. As XML data is passed to the reporting component, the XML data is transformed for publication via an Internet-based web page such that the data is viewable by interested users on a near real-time basis.

54 Claims, 9 Drawing Sheets

OTHER PUBLICATIONS

"CustomerCentric Technology—NetGenesis: Increase Web ROI Through Deeper Understanding", http://web.archive.org/web/20021003222304/http://www.customercentricsolutions.com/c . . . , CustomerCentric, Oct. 3, 2002, p. 1.

Dragan, Richard V., "WebTrends: Powerful web Reporting Gets Easier", http://web.archive.org/web/20021017212440/www.pcmag.com/article2/0,4149,480766,0 . . . , PC Magazine, Sep. 17, 2002, pp. 1-5.

"DeepMetrix Website Analysis Solutions", "DeepMetrix Visitor Intelligent Service—Mining Edition", http://web.archive.org/web/20030411001028/www.deepmetrix.com, http://web.archive.org/web/20030409191948/www.deepmetrix.com/hosted/mining/, http://web.archive.org/web/20030409232554/www.deepmetrix.com/hosted/mining/advan . . . , http://web.archive.org/web/20030410005341/www.deepmetrix.com/hosted/mining/feature . . . , DeepMetrix, Apr. 11, 2003, 22 pages.

"DeepMetrix Website Analysis Solution", "LiveStats Log Analyzer—Service Provider Edition", http://www.web.archive.org/web/20030411001028/www.deepmetrix.com/, http://web.archive.org/web/20030409201353/www.deepmetrix.com/log$_{13}$ analyzer/xsp, http://web.archive.org/web/20030205090533/www.deepmetrix.com/log$_{13}$ analyzer/xsp/fea . . . , DeepMetrix, Apr. 11, 2003, 4 pages.

* cited by examiner

SYSTEM AND METHOD FOR PERFORMING REMOTE TRACKING AND REPORTING OF COMPUTING SYSTEM PERFORMANCE, USAGE, AND SECURITY DATA

FIELD OF THE INVENTION

The present invention generally relates to systems and methods for data collection, analysis and reporting. More particularly, the present invention relates to systems and methods for performing remote collection, analysis and reporting of computing system performance, usage and security data.

BACKGROUND OF THE INVENTION

With the advent of modern local, remote, and distributed computing systems, a need has developed for monitoring such computing systems to ensure system efficiency, reliability, performance and security. Administrators for Internet Service Providers must track user visits to a plurality of web sites to report usage data to subscribers. Administrators must scan systems distributed across vast networks for viruses and other unwanted data. Administrators of large computing networks must track application usage, security logs and error logs. Changes to computer registries must be tracked for maintenance and security of individual and network computers. Unfortunately there exists no efficient and centralized method or system to allow an interested person, such as a system administrator, to review in near real-time performance, security and usage data of systems such as those described above.

Often, a systems engineer or administrator must spend a number of days of each month aggregating data for a given system. For example, a systems engineer may spend several calendar days per month collecting and summarizing system and application event logs, performance counters, security logs and Internet Information Services (IIS) logs for a distributed Internet services system in order to report performance, security and usage data. Because of the tedious and time consuming nature of the data collection and summarization, the data is always several days or even months out of date by the time summary reports are prepared and reviewed.

Accordingly, there is a need for a method and system for collecting, aggregating, and reporting computing systems data in a near real-time basis. It is with respect to these and other considerations that the present invention has been made.

SUMMARY OF THE INVENTION

Embodiments of the present invention provide systems and methods for performing remote collection, analysis, aggregation and reporting of computing systems performance, usage, and security data.

Generally described, a computing systems data reporting system (also referred to herein as a spider system) is comprised of a processing component and a reporting component. The processing component includes a configuration file and a system analysis and aggregation executable program module. The configuration file contains data specifying input directories associated with the systems to be monitored by the system data reporting system. For example, the input directories may include data logs from a variety of local, remote, and distributed servers including data, such as Internet Information Services data, uniform resource locator (URL) scan security data, Windows® media data, performance counter data, system and application events data, computing system registry data, user account information data, and the like. The configuration file likewise contains data specifying directories that provide the memory locations to which aggregated systems data should be written.

The system analysis and aggregation executable module utilizes the input and output directory information from the configuration file to collect performance, usage and security data from sources such as those described above. Once the executable module consumes systems data from target systems, the data is output as Extensible Markup Language (XML) formatted data to the reporting component.

The reporting component comprises an XML output memory component for storing aggregated data retrieved from the executable module of the processing component. As XML data is passed to the reporting component, the XML data is transformed for publication via an Internet-based web page such that the data is viewable by interested users on a near real-time basis. Because the data is XML-formatted, the data may be extracted for inclusion in a variety of different reporting formats. Alternatively, users of the aggregated data may extract the XML-formatted data directly from the XML output memory component to allow such users to perform additional processing on the data.

According to another aspect of the invention, the system data reporting system may be scaled up to store aggregated XML data for incremental periods, for example daily, and the executable component may then further aggregate the stored data to provide historical summary reports, such as monthly data reports. The system may be further scaled up to include an executable component for each of a plurality of different data sources, whereby data across the variety of data sources may be aggregated to provide systems data reporting where a local, remote or distributed computing system includes a number of disparate data sources that are all operated or controlled by a single administrative entity.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

As described briefly above, embodiments of the present invention are directed to systems and methods for performing remote collection, aggregation, and reporting of computing system performance, usage, and security data on a near real-time basis. In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

Figure 1:
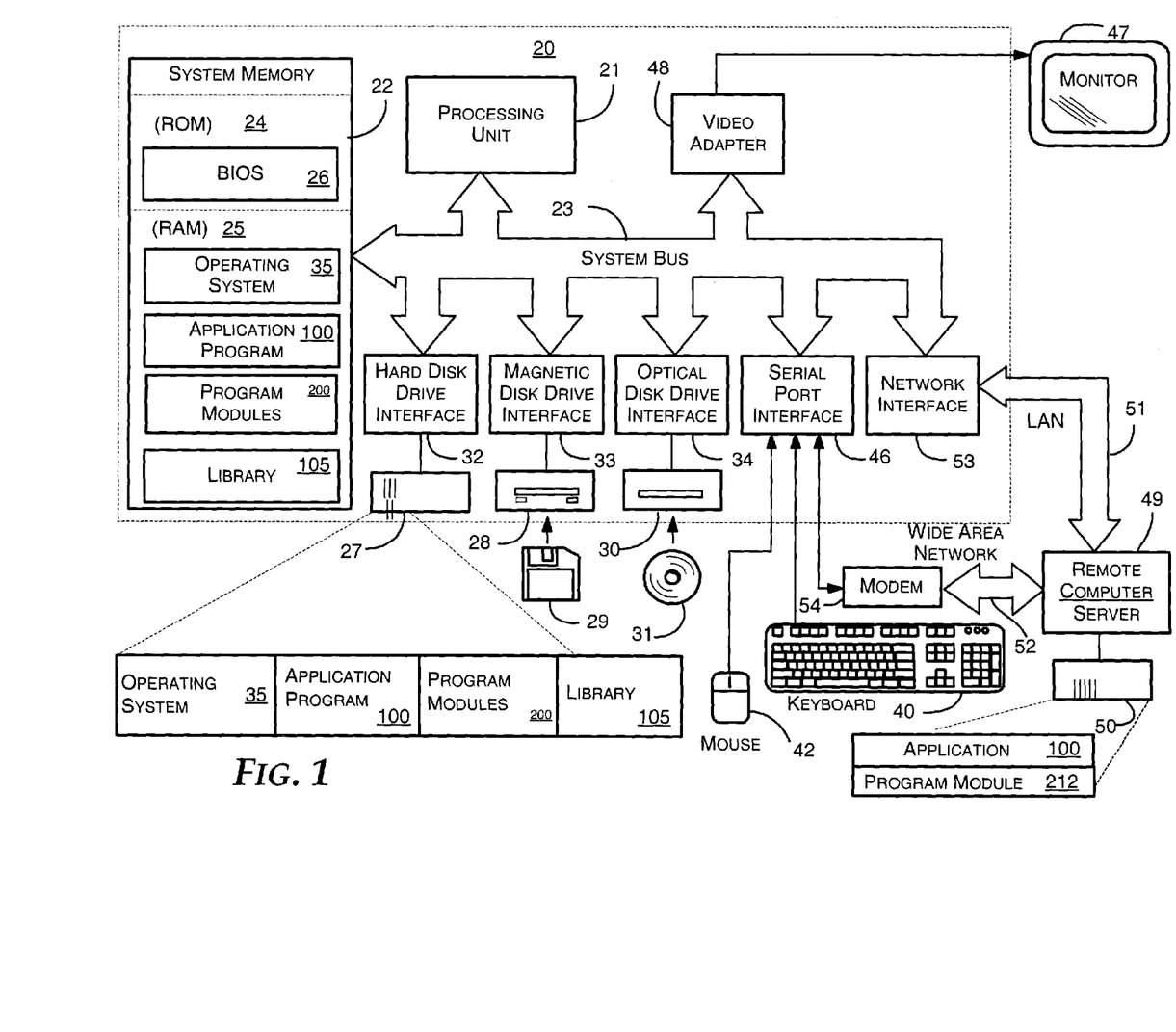
FIG. 1 is a block diagram showing the architecture of a personal computer that provides an illustrative computing operating environment for embodiments of the present invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, cell phones, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 100, a computing systems data reporting system module 200 (or other type of program module), and other program modules (not shown).

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
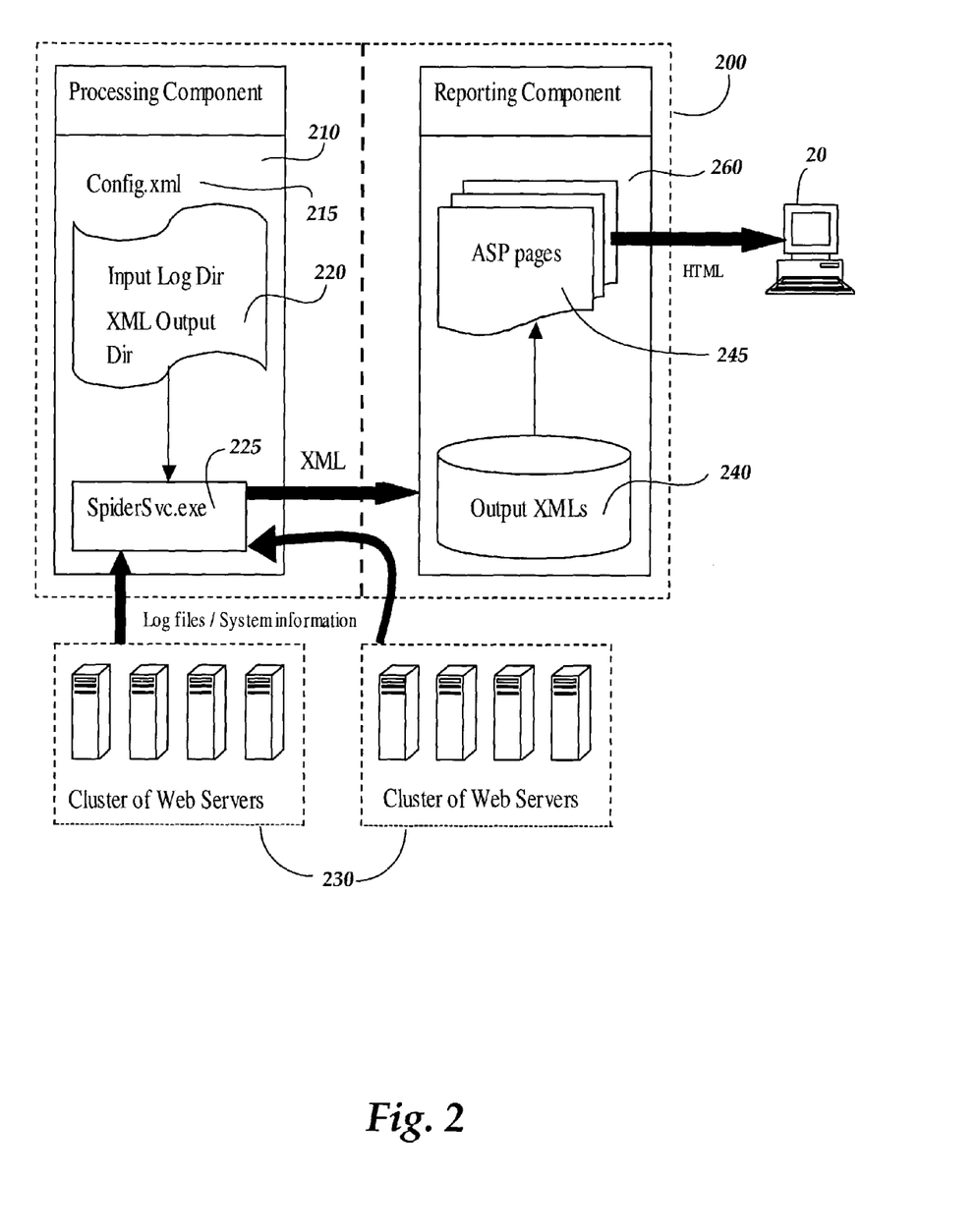
FIG. 2 is a block diagram illustrating a system data reporting system according to embodiments of the present invention.

FIG. 2 is a block diagram illustrating a computing system 200 data reporting system according to embodiments of the present invention. As briefly described above, a computing system data reporting system 200 comprises a processing component 210 and a reporting component 260. According to embodiments of the present invention, the data reporting system 200 may be comprised of software modules resident on a local or remote computers or servers linked to integrated or remotely accessible memory components for storing data collected and aggregated, as described below. The processing component 210 includes a configuration file or module 215 and a system analysis and aggregation executable component 225. The configuration file 215 contains data, illustrated as data 220 in FIG. 2, specifying input directories associated with systems to be monitored by the data reporting system 200 and output directories that provide memory locations to which aggregated systems data collected and aggregated by the executable component 225 is to be written.

The executable component 225 is an executable software program module operable to retrieve data from any of a variety of data sources, such as the cluster of web servers 230, illustrated in FIG. 2. The executable component 225 is further operative to aggregate data retrieved from data sources 230 and to output the aggregated data in Extensible Markup Language (XML) formatted data. That is, the executable component 225 is operable to populate an XML-formatted data structure structured according to an XML schema file setting the grammatical and structural rules associated with the XML formatted data. By outputting the aggregated system data as XML-formatted data, the executable component 225 enables down stream publication of the data and additional processing of the data so long as the publication or additional processing of the data extracts data from the XML structured data file according to the prescribed XML schema file.

The executable component 225 may collect systems data from a variety of data sources via the input directories or Application Programming Interfaces (API) obtained by the executable component from the configuration file 215. The cluster of web servers 230 are illustrated for purposes of example only as a cluster of servers from which the executable component 225 obtains systems data that must be reported to an interested user, such as a system administrator. For example, the cluster of web servers 230 may include the web servers of an Internet Services Provider. Accordingly, the executable component 225 may obtain from each server in the cluster of web servers 230 information regarding the number of user visits to given websites, information regarding uniform resources locator (URL) security scans scanning for virus attacks or other unwanted data including the results of such scans, numbers of user log-in and log-out entries, security logs data, error logs data, and the like. Alternatively, the servers 230 are illustrative of components of a distributed computing network, such as an NT® computing network provided by Microsoft Corporation of Redmond, Wash., whereby data retrieved by the executable component 225 includes application usage across components of the network, security logs data including user log-in and authentication data, error logs data, and the like.

The servers 230 are also illustrative of one or more computer operating system performance monitoring data repositories whereby data is prepared by the operating system of a single computer or of a plurality of computers situated in a computing network providing performance monitoring data such as processing speed, memory usage, or any other performance data that may be provided for a given computer or a group of computers. The servers 230 are also illustrative of a single computer or plurality of networked computers whereby computer registry data is obtained by the executable component 225 for aggregating and reporting changes in the registry of a single computer or in the registries of multiple computers. In short, the servers 230 illustrated in FIG. 2 are illustrative of any data source from which the executable component 225 may collect data of interest to an administrator or other interested party for reviewing performance, usage, and security data for any of a number of computing systems for which the administrator or other interested party may be responsible.

Referring still to FIG. 2, the data reporting system 200 includes a reporting component 260. The reporting component 260 includes an XML output memory location 240 for receiving aggregated XML-formatted data from the executable component 225. A plurality of active server pages (ASP) 245 are illustrated in FIG. 2 for reading XML files from the XML output memory location 240 and for rendering Internet-based web page formatted reports viewable at the computer 20. As will be described below, the XML-formatted data is preferably transformed to Hypertext Markup Language (HTML) formatting by use of an Extensible Stylesheet Transformation (XSLT) file for merging an Extensible Stylesheet Language file with a given XML data file to generate an HTML report that may be published as an Internet-based web page viewable at the computer 20. According to embodiments of the present invention, the web page viewable at the computer 20 is in the form of a customizable report showing aggregated data required by the interested user. For example, if the user is a systems administrator for an Internet Services Provider, the administrator may have requested a report showing the number of user visits (hits) to a plurality of Internet web pages operated by the administrator's Internet Services Provider. The services provider may also provide uniform resource location (URL) scanning services for scanning for computer viruses or other unwanted data for customers of the Internet Services Provider. Accordingly, the administrator may desire a report showing the number of URL scans performed on customer systems and any results thereof.

As should be understood, the data published via the Internet web page is near real-time. That is, as the executable component 225 obtains data from the servers 230, that data is aggregated as required for the user report, and the data is immediately output as XML-formatted data followed by transformation for publication to the web page. As described above, the administrator may likewise request a report showing performance monitoring data for one or more computers, computer registry data showing updates and other changes to registry data, or any other performance, usage, or security data that may be obtained by the executable component 225.

Figure 3:
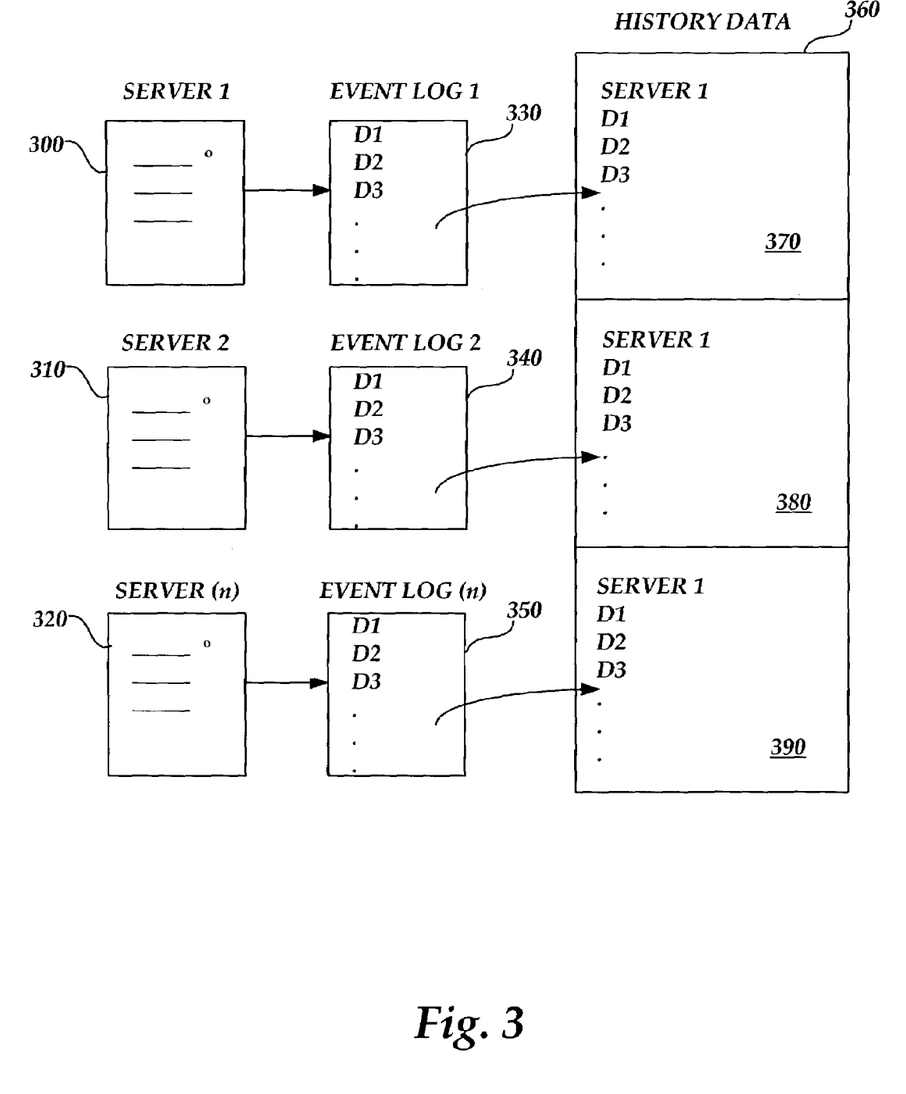
FIG. 3 is a block diagram illustrating a collection and aggregation of network events data from a plurality of servers according to an embodiment of the present invention.

As mentioned briefly above, data obtained by the executable component 225 may also include system and application event log data. FIG. 3 is a block diagram illustrating a collection and aggregation of system and application events data from a plurality of servers according to an embodiment of the present invention. A first server 300 is illustrated for passing event log data for each day of server operation to an event log 330. A second server 310 is illustrated for passing event log data for each day of operation to an event log 340. An nth server 320 is illustrated for passing event log data to an nth event log for each day of operation of the nth server. As is known to those skilled in the art, system and application event log data may include data regarding software application usage, security information including user log-in/log-out, authentication data, and a variety of error information collected for any of a number of computers networked via the servers 300, 310, 320.

As is known to those skilled in the art, system and application event logs 330, 340, 350 typically include a discrete amount of memory capacity for recording event log data for each date of operation D1, D2, D3, DN. Once the maximum amount of memory capacity allocated for a given event log is consumed, new event log data from the corresponding server is typically overwritten over existing event log data. Accordingly, an administrator or other interested user of the data does not have access to historical data for a given server more than the maximum amount of data that is currently accessible from a given event log. That is, if only the last five days worth of event log data may be maintained according to the allocated amount of memory capacity, the administrator may only see the last five days worth of event log data. If the administrator is concerned about certain security information over the course of the last 60 days, the administrator has no readily available method of obtaining the security information for the days beyond those maintained in the event log.

According to embodiments of the present invention, history data 360 for each server may be created because each event data item may be obtained by the executable component 225 as the event occurs and may be passed as XML data to the reporting component 260 for publication to the administrator, as described above with reference to FIG. 2. The administrator then may create a history data file 360 for each server in which the administrator is interested by maintaining data published for a given server for as long as the administrator desires. Alternatively, because the data aggregated by the executable component 225 is output in XML format, an administrator may write a software program for obtaining the XML-formatted data saved to the XML data output memory location 240 by the executable component 225 and for processing the data as desired by the administrator. That is, the administrator may write a software program utilizing an XML schema associated with the XML-formatted data generated by the executable component 225. Accordingly, data from one or more networked servers in which the administrator is interested may be extracted, aggregated, summarized or otherwise processed according to any software program module written by the administrator capable of consuming the XML data received from the executable component 225. Therefore the administrator may create a history data file 360 containing as many days of event log data as the administrator desires for any one or more server 300, 310, 320.

Figure 4:
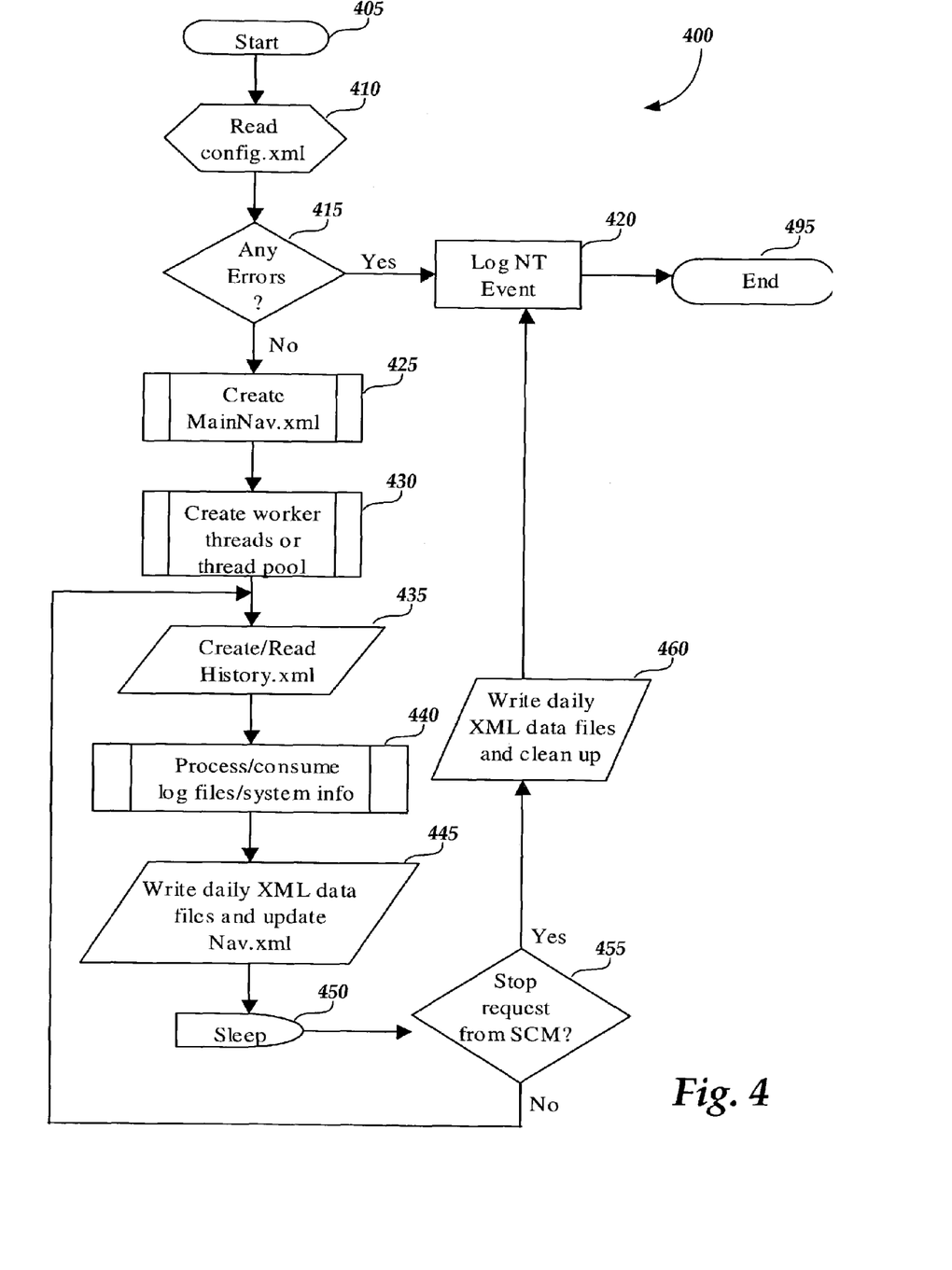
FIG. 4 is a flow diagram showing an illustrative routine for collecting and aggregating computing system performance, usage, and security data according to an embodiment of the present invention.

FIG. 4 is a flow diagram showing an illustrative routine for collecting and aggregating computing system performance, usage, and security data according to an embodiment of the present invention. The method 400 begins at start step 405 and proceeds to step 410 where the executable component 225 reads the configuration file 215 to obtain input log directory data to determine which data sources to obtain data from for preparing reports via the reporting component 260. The executable component 225 also reads from the configuration file the output directory data to determine which memory location in the XML data output memory 240 for writing aggregated data collected. Additionally, the configuration file may include filtering information that directs the executable component 225 to obtain only certain types of data. For example, the executable component 225 may obtain web page visits (hits) anytime more than 1,000 hits is recorded, or after set processing time durations.

At step 415, a determination is made as to whether any errors are present that prevent the executable component from obtaining data from a designated data source in association with the configuration file data 220. If errors are present, an error event is logged at step 420 and the method ends at step 495. If no errors are present, the method proceeds to step 425, and the executable component 225 creates a main navigation file listing out all the data sources, such as the web servers 230, illustrated in FIG. 2, from which data will be collected. At step 430, individual data collection and aggregation program modules, also known as worker threads, are designated for each data source, such as each server of the cluster of web servers 230, that will be used by the executable component 225 for collecting and aggregating data from each required data source. At step 435, each worker thread module creates a history file for tracking when the worker thread module last processed data from a given data source. As is understood by those skilled in the art, processing of data is interrupted from time to time where processing functionality is needed for other computer processes. During such an idle time for any given worker thread module, the worker thread module marks in an offset table the location of the last data processed from a given data source. Accordingly, when processing by a given worker thread module is next started by the computer operating system under which the worker thread module operates, the worker thread module may read the history file to determine where processing last stopped and thus to determine where to now begin processing.

At step 440, each worker thread module dispatched by the executable component 225 for processing data for each data source such as each web server 230 illustrated in FIG. 2 consumes the desired data, for example web site user visits or hits. As the data is obtained, each worker thread module also aggregates the data, as prescribed. For example, it may be prescribed that user visits to web sites operated on the web servers 230 be aggregated showing the number of visits per hour. For another example, data may be aggregated for all user visits to a plurality of different web sites over a given operation duration. At step 445, the executable component 225 writes the data obtained and aggregated by the individual worker thread modules in XML format to the XML output memory 240 of the reporting component 260

At step 445, if necessary, a navigation file may be created and/or updated which relates the XML files written by the executable component 225 to the servers or data sources to which that XML data relates and including the dates associated with the obtained data. As should be understood, this navigation data is necessary for ultimately rendering reports showing the obtained and aggregated data. At step 450, if all processing required by the executable component 225 has been accomplished, processing may go idle until further processing instructions are received. The method proceeds to step 445 and a determination is made as to whether a service control module within the executable component 225 stops the request for processing by worker thread modules of data from the designated data sources. If not, the method proceeds back to step 435, and each worker thread module reads the history file to determine where processing should begin for designated data sources, and processing continues, as described above. If the executable component is interrupted by the Service Control Module (SCM), the method proceeds to step 460 and any remaining XML data files for remaining obtained and aggregated data is written to the XML data memory 240. The method then proceeds to step 420, and if necessary, an event in association with the data processing accomplished is logged, and the method ends at step 495.

Figure 5:
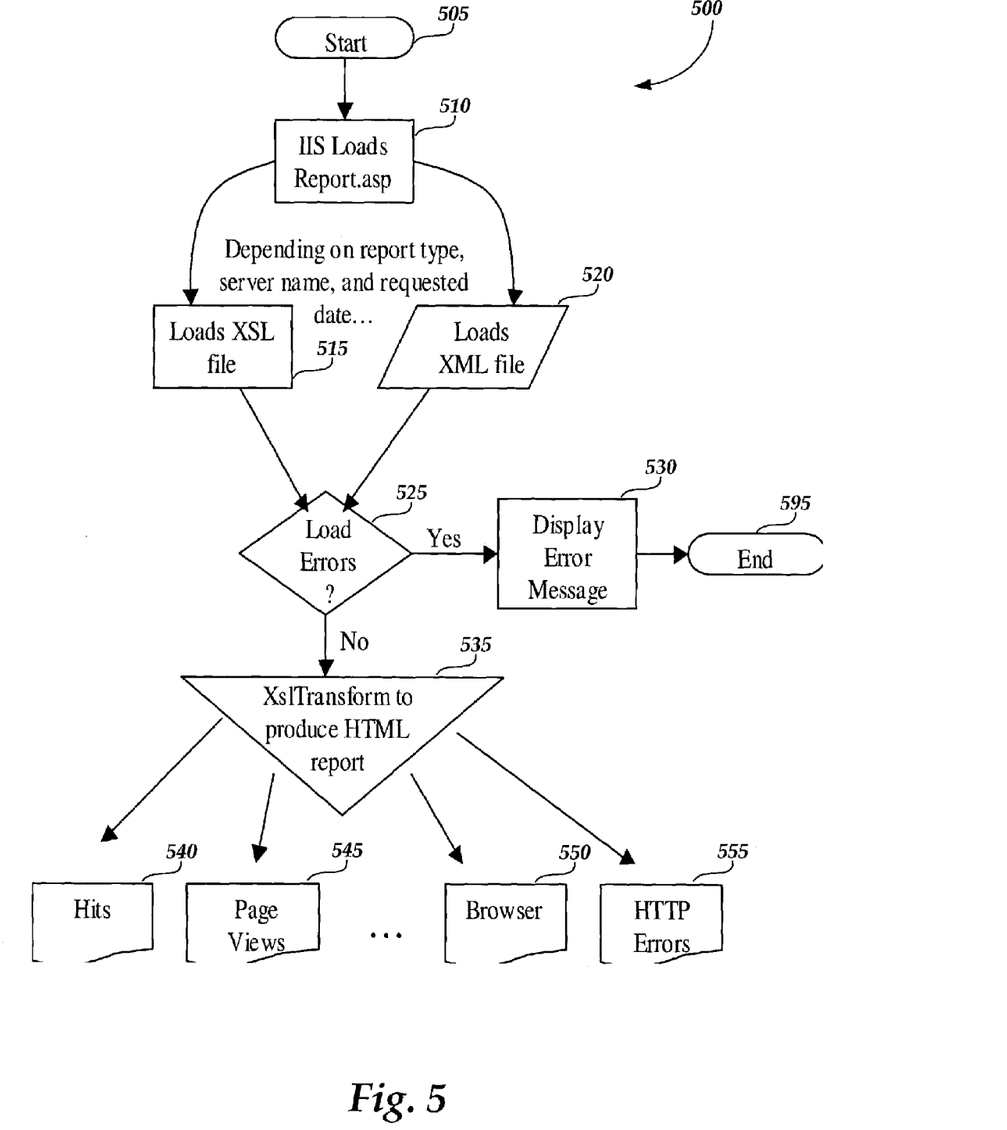
FIG. 5 is a flow diagram illustrating an illustrative routine for transforming XML-formatted systems data for publication to Internet-based web page according to embodiments of the present invention.

After XML data is output by the executable component 225 to the memory 240, the reporting component 260 prepares the data for publication to a web site for review by an administrator or other interested party at the local computer 20. FIG. 5 is a flow diagram illustrating an illustrative routine for transforming XML-formatted systems data for publication to an Internet-based web page according to embodiments of the present invention. The method 500 begins at start step 505 and proceeds to step 510 where the web servers, such as Internet Information Services (IIS), load one or more active server pages for receiving transformed data for publishing the obtained and aggregated data to an Internet-based web page. At step 520, the web servers, such as Internet Information Services, load an appropriate XML file or files from the memory 240 corresponding to the one or more active server pages that will create desired reports. At step 515, an Extensible Stylesheet Language (XSL) file is loaded by the web servers for merging with the obtained XML file for transforming the XML file into HTML format for publication to an Internet-based web page.

At step 525, a determination is made as to whether any errors in loading the aforementioned file have occurred. If errors have occurred, an error message may be generated at step 530, and the method may end at step 595. If no errors have occurred, the web servers, such as the Internet Information Services, utilize an XSLT file to merge the aforementioned XSL file and XML file to produce an HTML report for publication on the one or more active server pages. Production of an HTML file by use of an XSL transformation file to merge an XSL file with an XML file is well known to those skilled in the art. At step 535, the transformed HTML file is output to the active server pages, which are in turn published to the Internet-based web page required for reporting the desired data.

As illustrated in FIG. 5, a variety of different data reporting may be published. At step 540, the number of user visits or hits to one or more Internet web sites may be published in a report at the computer 20. At step 555, a report of hypertext transfer protocol (HTTP) transmission errors reported from given data sources may be reported. In short, any data that may be obtained by the executable component 225 from one or more data sources, as described above, may be aggregated and output as XML data. The XML data may be merged with an XSL stylesheet for placing the data in a format required for publishing the data using the active server pages to an Internet-based web page, and an XSLT file may be utilized for merging the XSL file and the XML file to create the appropriate HTML file for publication to the web site. A further description of the web-based reports that may be provided to a user of the data at the computer 20 is described below with reference to FIGS. 8 and 9.

Figure 6:
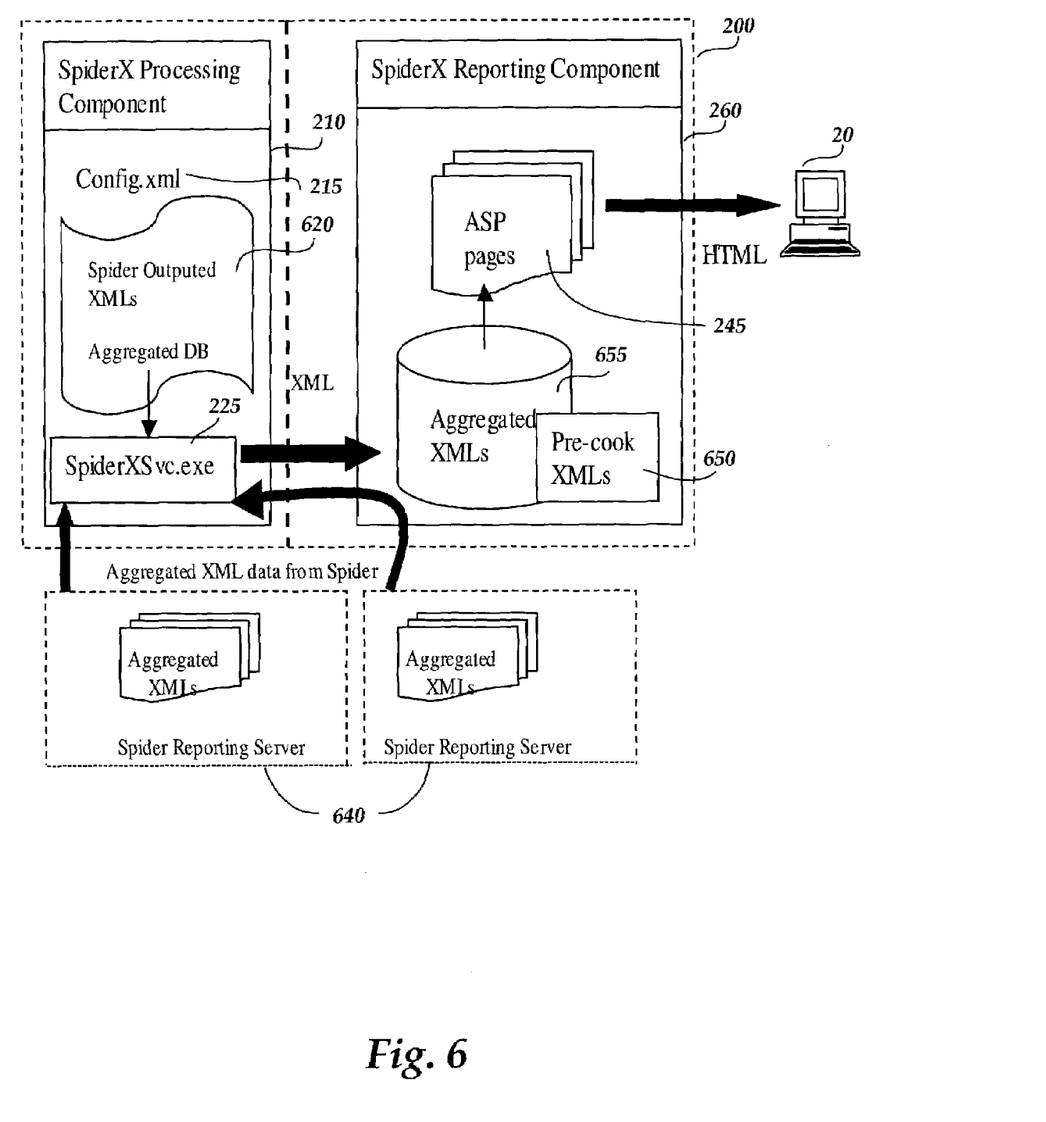
FIG. 6 is a block diagram of a system data reporting system scaled up to report aggregated historical system data according to embodiments of the present invention.

FIG. 6 is a block diagram of a system data reporting system scaled up to report aggregated historical system data according to embodiments of the present invention. As briefly described in the summary section above, the system data reporting system of the present invention may be scaled up to store and report aggregated XML data for incremental periods, for example, daily periods and monthly periods in order to generate historical data reporting. Referring to FIG. 6, the configuration file may provide the executable component 225 with input directory information associated with previously aggregated and outputted XML files. For example, referring to FIG. 6 the aggregated XML files 640 include aggregated XML files for previous periods of data aggregation. For example, one aggregated XML file may be stored for each day of data collection and reporting over the course of one month. The data 620 provided by the configuration file 215 may also include an output directory location such as a database to which obtained aggregated XML files 640 may be passed by the executable component 225. Accordingly, as the executable component 225 obtains real-time data from a variety of data sources, as described above with reference to FIGS. 2-5, according to the embodiment illustrated in FIG. 6, the executable component 225 may obtain one or more previously aggregated XML data files 640 for passing to the reporting component 260 in order to create further data aggregation as required by an end user.

Once the previously aggregated XML files 640 are obtained by the executable component 225, the data is passed in XML format to an aggregated XML database 655. According to one embodiment of the present invention, the database 655 may be a SQL server manufactured by Microsoft Corporation of Redmond, Wash. The pre-cooked XML's block 650 represents the XML data files generated from the database 655 for ease of rendering and scalability. The previously aggregated XML files may next be merged with an appropriate XSL file and transformed using an XSLT file to produce HTML formatted data for publication through an Internet-based web page via the active server page 245 for review at a computer 20. Accordingly, by aggregating previously aggregated XML data files, historical reporting may be generated for review by an end user. That is, monthly reports may be generated by aggregating previously aggregated daily reports. Yearly reports may be generated by aggregating previously aggregated monthly reports, and so on.

Figure 7:
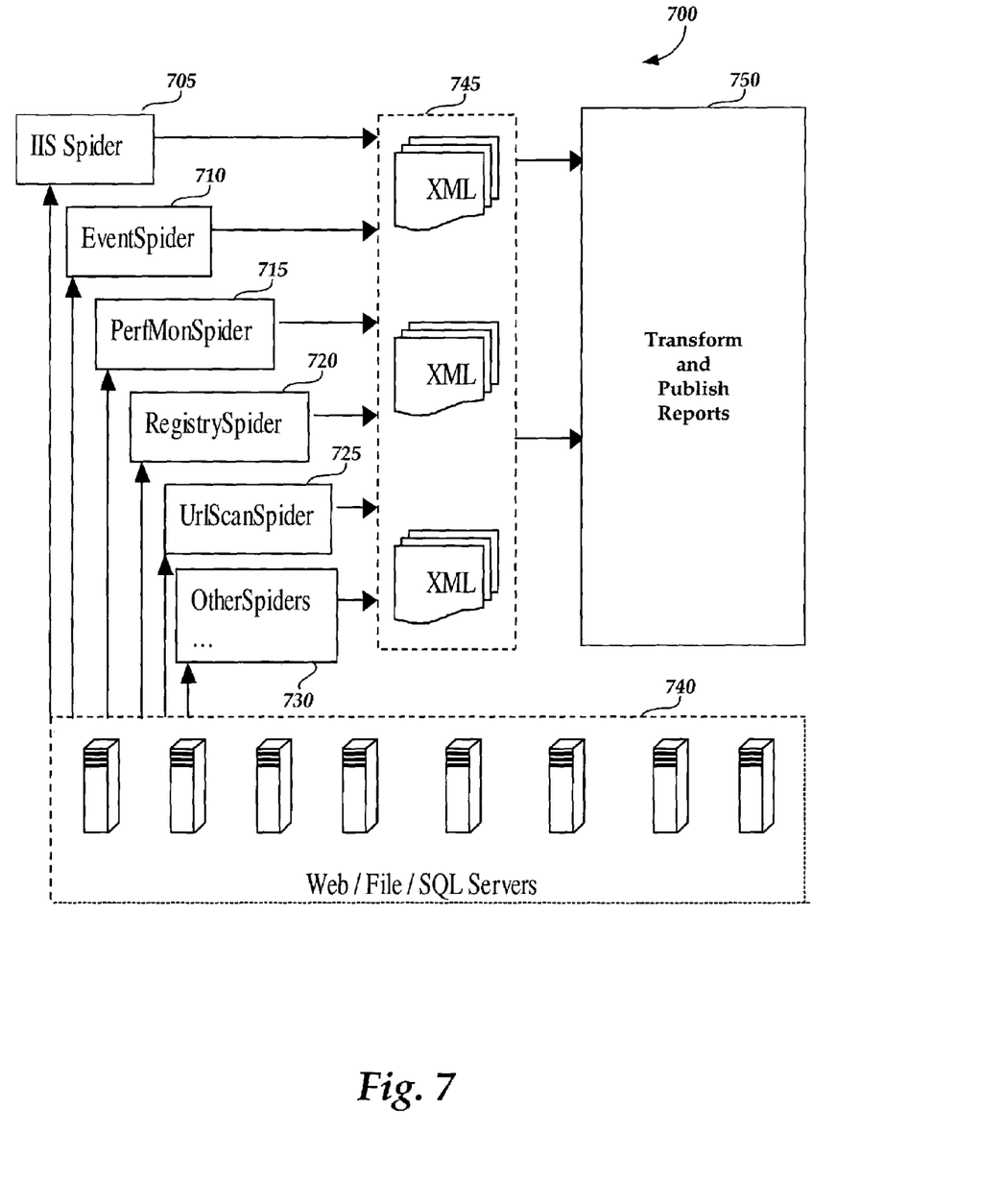
FIG. 7 is a block diagram illustrating a system data reporting system scaled for collecting, aggregating and reporting data from a variety of disparate data sources according to embodiments of the present invention.

FIG. 7 is a block diagram illustrating a system data reporting system scaled for collecting, aggregating and reporting data from a variety of disparate data sources according to embodiments of the present invention. In addition to scaling the data reporting system 200 for aggregating previously aggregated data to create historical data files, the system may be further scaled to include in a single data reporting system a plurality of executable components 225 for collecting an aggregating data for a plurality of different types of data whereby data across a variety of data sources may be aggregated to provide systems data reporting for a local, remote or distributed computing system which includes a number of disparate systems which may all operated or controlled by a single administrative entity.

For example, referring to FIG. 7, a data reporting system 705 for collecting and aggregating Internet Information Services data may be combined with a data reporting system 710 for collecting and aggregating network server data, for example. In addition, a performance monitoring data reporting system 715, a computer registry data reporting system 720, a URL scan data reporting system 725 and other data reporting systems, as required, may all be combined in a single data reporting system 700 for collecting and aggregating data from a variety of data sources associated with each individual data reporting system 705 through 730. As described above with reference to FIGS. 2 through 6, data collected and aggregated from each data reporting system 705-730 may be outputted as XML data 745. The XML data 745 may be extracted and processed further, or the data may be transformed for publication to an Internet-based web page, as described above. Further, as described above with reference to FIG. 6, data collected and aggregated with respect to the system illustrated in FIG. 7 may also be aggregated with previously aggregated data to create historical data aggregation. Advantageously, the system illustrated in FIG. 7 may be utilized by an administrator or other interested user who is responsible for reviewing and reporting data for a variety of disparate computer systems without the need for obtaining separate data reports for each of the different systems.

Figure 8:
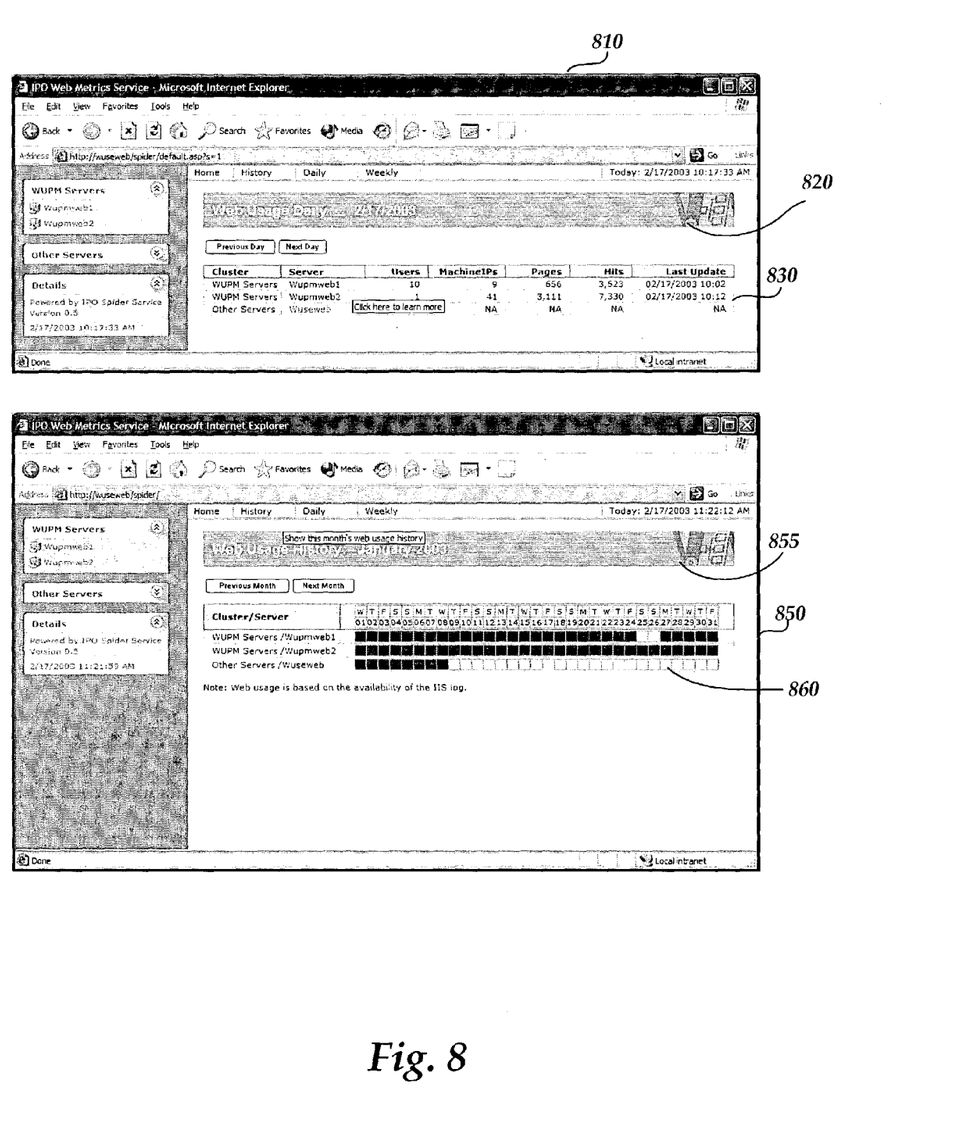
FIGS. 8 and 9 are illustrative computer screen diagrams showing exemplary data reporting pages according to embodiments of the present invention.
Figure 9:
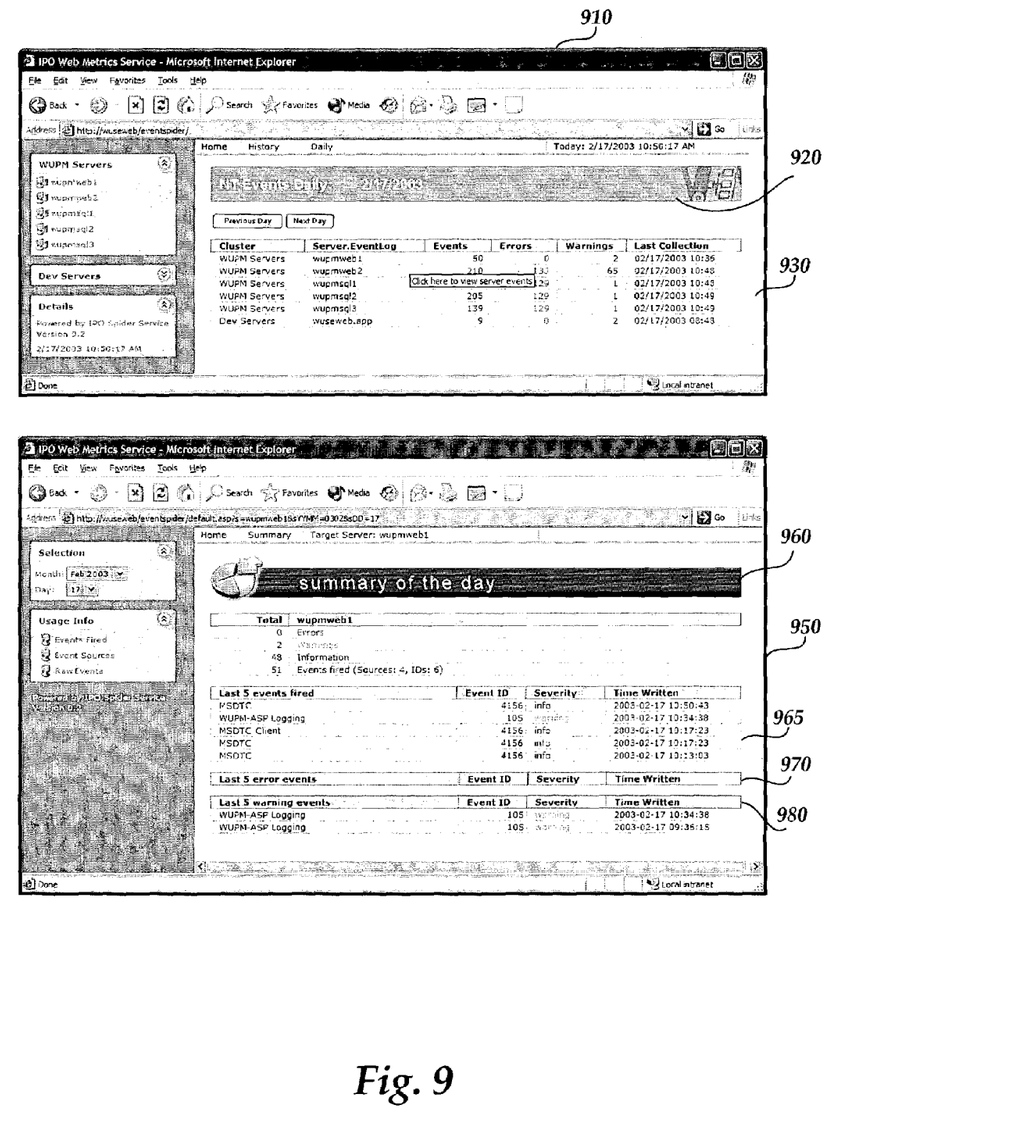

FIGS. 8 and 9 are illustrative computer screen diagrams showing exemplary data reporting pages according to embodiments of the present invention. As described herein, once the system data is collected and aggregated, the data may be transformed into HTML-formatted data for publication via an Internet-based web page. As shown in FIG. 8, an exemplary web page 810 is illustrated whereby daily web usage data for a particular date, Feb. 17, 2003, is reported. As shown in the report section 830, information is reported to the administrator or other user including the server cluster identification, the server identification, the number of users, the number of page views, and the number of user visits to the web pages. The web page 810 shows near real-time data published to the administrator or user, as described above with reference to FIGS. 2, 4, and 5. The web page 850 includes a web data log processing history 855 for a particular month, for example January 2003. As shown in the web page 850, a cluster/server data section 860 is provided showing web usage information for all the days of the subject month for the listed server clusters and servers. As described above with reference to FIG. 6, the historical data published in the web page 850, illustrated in FIG. 8, may be provided by aggregating previously aggregated data from each day of the subject month.

Referring to FIG. 9, another example web page 910 is illustrated. A system and application events daily report 920 is illustrated for a particular day, for example Feb. 17, 2003. In the events log information section 930, identification of server clusters, servers, the number of events for each server, the number of errors for each server, the number of warnings for each server, and the date and time of last data collection is illustrated. The web page 950, illustrated in FIG. 9, illustrates a daily system and application events summary 960 showing summary system and application events log information over the course of a selected day. As should be understood by those skilled in the art, the web pages illustrated in FIGS. 8 and 9 are shown for purposes of example only and are not limiting in any way of the amount of data and the reporting configuration of data that may be collected, aggregated, analyzed, and published in accordance with embodiments of the present invention.

As described herein, methods and systems are provided for performing remote collection, analysis, aggregation and reporting of computer system performance, usage, and security data. It will be apparent to those skilled in the art that various modifications or variations may be made in the present invention without departing from the scope or spirit of the invention. Other embodiments of the invention will be apparent to those skilled in the art from consideration of this specification and practice of the invention disclosed herein.

We claim:

1. A method of tracking and reporting systems data for a computing system, comprising:
   selecting a plurality of computing systems from which systems data is to be tracked and reported, wherein the plurality of computing systems include one or more disparate computing systems;
   creating a worker thread executable program for collecting and aggregating desired systems data from each of the plurality of computing systems;
   creating a history file for tracking the collection and aggregation of the systems data from each of the plurality of computing systems;
   collecting the systems data from the plurality of computing systems, wherein the system data comprises registry data, the registry data showing changes in the registry of at least one of the plurality of computing systems;
   aggregating the collected systems data according to desired types of data and desired incremental amount of data;
   saving the collected and aggregated systems data from the plurality of computing systems to a first memory location, whereby saving the collected and aggregated systems data includes saving the collected and aggregated systems data to the first memory location as a first markup language formatted data, wherein the collected and aggregated systems data is written to a first markup language data store substantially in real time;
   transforming the collected and aggregated systems data into a format for reporting the data via an Internet web page, whereby transforming the collected and aggregated systems data into a format for reporting the data via an Internet web page includes transforming the first markup language formatted data to a second markup language formatted data for reporting the systems data via an Internet web page;
   creating a report for publishing the collected and aggregated systems data via an Internet web page;
   during an idle time for the worker thread executable program, marking a location in an offset table of the collected and aggregated systems data in the history file; and
   prior to a subsequent collection and aggregation of systems data from the plurality of computing systems, reading the history file to determine where the previous collection and aggregation of desired systems data stopped and to determine where to begin the subsequent collection and aggregation of systems data from the plurality of computing systems.

2. The method of claim 1, prior to collecting systems data from the plurality of computing systems, further comprising the steps of:
   obtaining an input data source from which systems data from at least one of the plurality of computing systems is received; and
   obtaining an output memory location to which systems data from at least one of the plurality of computing systems is output.

3. The method of claim 1, whereby transforming the first markup language formatted data to the second markup language formatted data includes:
   obtaining an Extensible Stylesheet Language (XSL) file for merging with XML formatted data; and
   merging the XSL file and the XML data using an Extensible Stylesheet Language Transformation (XSLT) file for transforming the XML formatted data into HTML formatted data for reporting the systems data via an Internet web page.

4. The method of claim 3, whereby creating a report for publishing the systems data via an Internet web page includes creating an HTML formatted report for publishing the systems data via an internet web page.

5. The method of claim 4, further comprising publishing the report as an Internet web page in near real-time relation between a time of publishing the report and a time of collection of the systems data.

6. The method of claim 1, further comprising storing a plurality of successive aggregated systems data reports published as Internet web pages.

7. The method of claim 6, further comprising creating an historical systems data report comprised of the plurality of successive aggregated system data reports published as Internet web pages.

8. The method of claim 1, prior to selecting a plurality of computing systems from which systems data is to be tracked and reported, launching a computer systems data reporting system for tracking and reporting systems data from the plurality of computing systems.

9. The method of claim 8, whereby launching a computer systems data reporting system includes:

launching a processing component of the computing systems data reporting system for collecting and aggregating systems data from the plurality of computing systems; and launching a reporting component of the computing systems data reporting system for preparing and publishing systems data reports for one or more computing systems.

10. The method of claim 9, further comprising:

populating a configuration file with at least one input data source from which systems data for the plurality of computing systems is received; and populating the configuration file with at least one output memory location to which systems data from the plurality of computing systems is output.

11. The method of claim 10, further comprising:

reading the configuration file for obtaining the at least one input data source from which systems data from the plurality of computing systems is received; and reading the configuration file for obtaining the at least one output memory location to which systems data from the plurality of computing systems is output.

12. The method of claim 11, whereby reading the configuration file for obtaining the at least one input data source and for obtaining the at least one output memory location includes reading the configuration file by an executable program module for collecting, aggregating and reporting systems data for the plurality of computing systems.

13. The method of claim 12, further comprising creating a navigation file for specifying the input data source from which the systems data from the plurality of computing systems is received.

14. The method of claim 1, whereby collecting and aggregating systems data from the plurality of computing systems includes collecting and aggregating systems data on an hourly basis.

15. The method of claim 1, whereby collecting and aggregating system data from the plurality of computing systems includes collecting and aggregating systems data on a weekly basis.

16. The method of claim 1, whereby collecting and aggregating systems data from the plurality of computing systems includes collecting and aggregating systems data on a monthly basis.

17. The method of claim 1, whereby collecting and aggregating systems data from the plurality of computing systems includes collecting and aggregating systems data on a quarterly basis.

18. The method of claim 1, whereby collecting and aggregating systems data from the plurality of computing systems includes collecting and aggregating systems data on a per event basis.

19. The method of claim 1, whereby the plurality of computing systems includes one or more Internet-based web servers.

20. The method of claim 1, whereby the plurality of computing systems includes one or more networked computing systems.

21. The method of claim 1, whereby the plurality of computing systems includes one or more personal computing systems.

22. The method of claim 1, whereby the plurality of computing systems includes a distributed network of personal computing systems networked together via one or more network administrative server computers.

23. The method of claim 19, whereby the systems data further includes Internet Information Services data.

24. The method of claim 23, whereby the systems data further includes Internet web page usage data.

25. The method of claim 24, whereby the systems data further includes Internet services security data.

26. The method of claim 25, whereby the systems data further includes uniform resource locater (URL) scanning data.

27. The method of claim 22, whereby the systems data further includes computer network administrative data.

28. The method of claim 27, whereby the systems data further includes system and application events log data.

29. The method of claim 28, whereby the systems data further includes network software application usage data.

30. The method of claim 29, whereby the systems data further includes network systems error reporting data.

31. The method of claim 30, whereby systems data further includes network systems security data.

32. The method of claim 31, whereby systems data further includes user log-in and user log-out data.

33. A system for tracking and reporting systems data of a computing system, comprising:

a computing systems data reporting system operative to track and report systems data from a plurality of computing systems, wherein the plurality of computing systems include one or more disparate computing systems;

the computing systems data reporting system including a processing component operative to collect and to aggregate systems data from one or more of the plurality of computing systems;

the processing component having a configuration file contain at least one input data source from which systems data from at least one computing system of the plurality of computing systems is received, and at least one output memory location to which systems data from the at least one computing system of the plurality of computing systems is output;

the processing component further comprising an executable program module operative to:

create a worker thread executable program for collecting and aggregating desired systems data from the plurality of computing systems, collect systems data for the at least one computing system of the plurality of computing systems, wherein the systems data comprises performance data, usage data, and security data, aggregate systems data for the at least one computing system of the plurality of computing systems, create a history file for tracking the collection and aggregation of the systems data from each of the plurality of computing systems, report systems data for the at least one computing system of the plurality of computing systems, save the collected and aggregated systems data as Extensible Markup Language (XML) formatted data in an XML data store, obtain an Extensible Stylesheet Language (XSL) file for merging with the XML formatted data; and merge the XSL file and the XML data using an Extensible Stylesheet Transformation (XSLT) file for transforming the XML data into Hypertext Markup Language (HTML) format for reporting the systems data via an Internet web page;

during an idle time for the worker thread executable program, mark a location in an offset table of the collected and aggregated systems data in the history file; and prior to a subsequent collection and aggregation of systems data from the plurality of computing systems, read the history file to determine where the previous collection and aggregation of desired systems data stopped and to determine where to begin the subsequent collection and aggregation of systems data from the plurality of computing systems; and the computing systems data reporting system further having a reporting component operative to prepare and to publish systems data reporting for the one or more computing systems.

34. The system of claim 33, whereby the executable program module is further operative:

to read the configuration file to obtain the at least one input data source and to obtain the at least one output memory location; and to create a navigation file for specifying the at least one input data source from which systems data is received.

35. The system of claim 34, whereby the executable program module is further operative to store the collected and aggregated systems data from the plurality of computing systems to a first memory location of the reporting component.

36. The system of claim 33, whereby the executable program module is further operative to publish the HTML format data in a report via an Internet web page.

37. The method of claim 33, whereby the plurality of computing systems includes one or more Internet-based web servers.

38. The method of claim 33, whereby the plurality of computing systems includes one or more networked computing systems.

39. The method of claim 33, whereby the plurality of computing systems includes one or more personal computing systems.

40. The method of claim 33, whereby the plurality of computing systems includes a distributed network of personal computing systems networked together via one or more network administrative server computers.

41. The method of claim 37, whereby the systems data includes Internet Information Services data.

42. The method of claim 41, whereby the systems data includes Internet web page usage data.

43. The method of claim 41, whereby the systems data further includes Internet services security data.

44. The method of claim 41, whereby the systems data further includes uniform resource locater (URL) scanning data.

45. The method of claim 40, whereby the systems data includes computer network administrative data.

46. The method of claim 40, whereby the systems data further includes system and application events log data.

47. The method of claim 40, whereby the systems data further includes network software application usage data.

48. The method of claim 40, whereby the systems data further includes network systems error reporting data.

49. The method of claim 40, whereby systems data further includes network systems security data.

50. The method of claim 40, whereby systems data further includes user log-in and user log-out data.

51. A computer readable medium containing instructions which when executed by a computer perform the steps of:

selecting a plurality of computing systems from which systems data is to be tracked and reported, wherein the plurality of computing systems include one or more disparate computing systems and at least one computing system includes a personal computer operating in a networked environment using logical connections to connect to at least one remote computer;

creating a worker thread executable program for collecting and aggregating desired systems data from each of the plurality of computing systems;

creating a history file for tracking the collection and aggregation of the systems data from each of the plurality of computing systems;

collecting systems data from the plurality of computing systems, wherein the system data comprises registry data, the registry data showing changes in the registry of at least one of the plurality of computing systems;

aggregating the systems data according to desired types of data and desired incremental amount of data;

parsing a plurality of log files in accordance with a configuration file;

saving the collected and aggregated systems data from the plurality of computer systems to a first memory location as Extensible Markup Language (XML) formatted data, wherein the collected and aggregated systems data are written to an XML data store in accordance with the configuration file;

transforming the XML formatted data to Hypertext Markup Language (HTML) formatted data for reporting the systems data via an Internet web page; and creating a report for publishing the systems data via an Internet web page substantially in real time;

during an idle time for the worker thread executable program, marking a location in an offset table of the collected and aggregated systems data in the history file; and prior to a subsequent collection and aggregation of systems data from the plurality of computing systems, reading the history file to determine where the previous collection and aggregation of desired systems data stopped and to determine where to begin the subsequent collection and aggregation of systems data from the plurality of computing systems.

52. The computer readable medium of claim 51, prior to collecting systems data from the plurality of computing systems, further comprising the steps of:

obtaining an input data source from which systems data from the plurality of computing systems is received; and obtaining an output memory location to which systems data from the plurality of computing systems is output.

53. The computer readable medium of claim 52, whereby transforming the XML formatted data to HTML formatted data includes:

obtaining an Extensible Stylesheet Language (XSL) file for merging with the XML formatted data; and merging the XSL file and the XML data using an Extensible Stylesheet Language Transformation (XSLT) file for transforming the XML formatted data into HTML formatted data for reporting the systems data via an Internet web page.

54. The method of claim 1, wherein saving the collected and aggregated systems data as the first markup language formatted data comprises saving the collected and aggregated systems data as Extensible Markup Language (XML) formatted data in an XML data store; and wherein transforming the first markup language formatted data to a second markup language formatted data comprises transforming the XML formatted data to Hypertext Markup Language (HTML) formatted data.

* * * * *